(12) United States Patent
Kalbas et al.

(10) Patent No.: US 6,374,451 B1
(45) Date of Patent: Apr. 23, 2002

(54) SYSTEM FOR WIPING WINDSHIELDS WITH A SPHEROIDAL CURVATURE

(75) Inventors: Hanswerner Kalbas; Günter Gfatter, both of Vienna (AT)

(73) Assignee: Knorr-Bremse Systeme fur Schienenfahrzeug GmbH, Munich (DE)

( * ) Notice: Subject to any disclaimer, the term of this patent is extended or adjusted under 35 U.S.C. 154(b) by 0 days.

(21) Appl. No.: 09/288,821

(22) Filed: Apr. 9, 1999

(30) Foreign Application Priority Data

Apr. 9, 1998 (DE) .......................... 198 16 210

(51) Int. Cl.⁷ ................... B60S 1/28; B60S 1/32
(52) U.S. Cl. .................. 15/250.23; 15/250.41; 15/250.32
(58) Field of Search ............... 15/250.23, 250.21, 15/250.41, 250.4, 250.32, 250.27, 250.351

(56) References Cited

U.S. PATENT DOCUMENTS 3,893,204 A  *  7/1975  Kolb
4,553,283 A  * 11/1985  Speth ...................... 15/250.41
4,581,786 A    4/1986  Brummer et al. ........ 15/250.41

FOREIGN PATENT DOCUMENTS

| DE | 1716199 |   | 2/1956  |            |
|----|---------|---|---------|------------|
| DE | 42 29 992 |  | 3/1993  |            |
| EP | 477803  | * | 4/1992  | ............ 15/250.351 |
| EP | 0525850 |   | 2/1993  |            |
| FR | 855665  | * | 2/1940  | ............ 15/250.23 |
| FR | 1138725 | * | 2/1957  | ............ 15/250.23 |
| FR | 2646801 | * | 11/1990 | ............ 15/250.351 |
| GB | 2108828 | * | 5/1983  | ............ 15/250.23 |
| GB | 2259851 |   | 3/1993  |            |
| JP | 85 744  | * | 5/1983  | ............ 15/250.23 |

* cited by examiner

Primary Examiner—Gary K. Graham
(74) Attorney, Agent, or Firm—Barnes & Thornburg

(57) ABSTRACT

A system for wiping windshields including a wiper arm system and a blade carrier for at least one wiper blade connected with the wiper arm system. The wiper arm system includes two individual wiper arms constructed such that, in at least one position, the individual wiper arms are, in a substantial area of their longitudinal dimension, parallel to one another in a plane essentially perpendicular to the windshield plane.

21 Claims, 4 Drawing Sheets

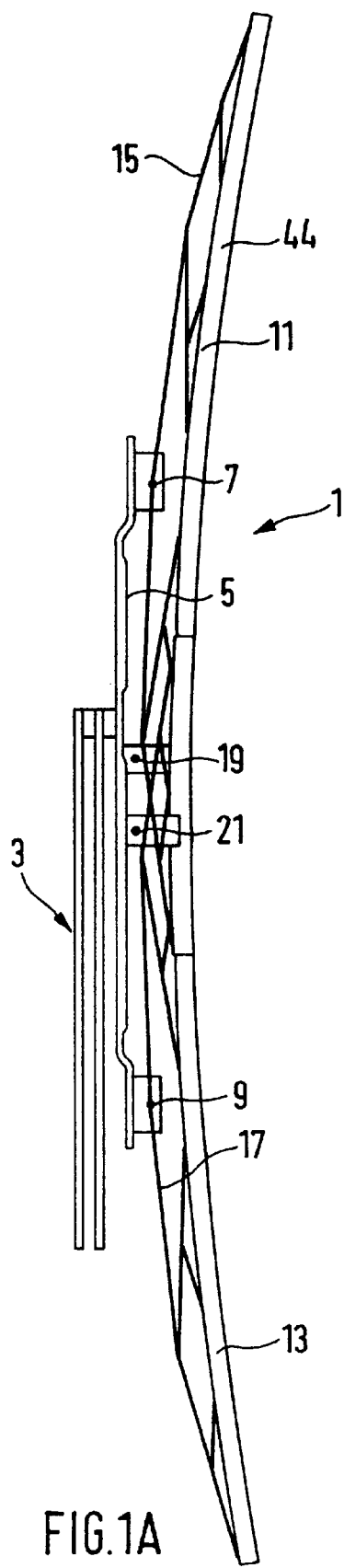
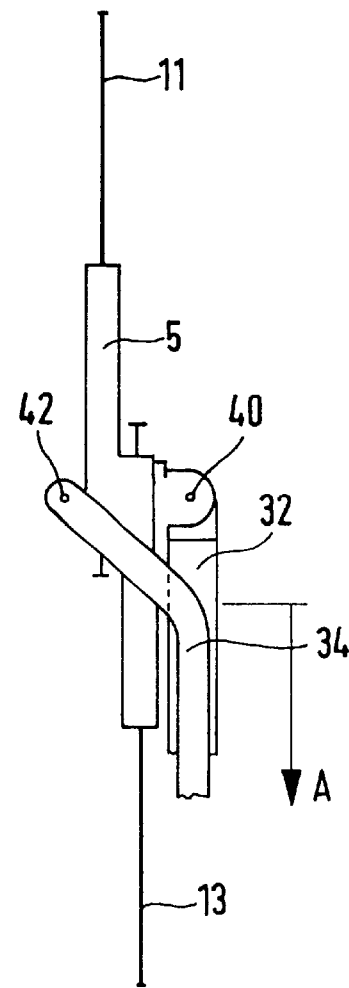
FIG.1A
FIG.1B

SYSTEM FOR WIPING WINDSHIELDS WITH A SPHEROIDAL CURVATURE

BACKGROUND AND SUMMARY OF THE INVENTION

The invention relates to a system for wiping windshields, particularly with a spheroidal curvature, having a wiper arm system and a blade carrier holding device connected to the wiper arm system.

Numerous wiping arrangements have become known for motor vehicles. For example, European Patent Document EP-A-92201935.1 shows a wiping arrangement which comprises a wiper arm made of a composite material.

Nowadays, large-surface windshields are used not only in the automobile industry but also rail vehicles, particularly in the high-speed operation, as, for example, in the case of the ICE (Intercity Railroad) of the Deutsche Bahn AG (German Railroad Corporation). Such windshields provide the required large and good viewing area for the driver of the traction vehicle. In order to ensure such a viewing area of vision during poor visibility, for example, in rainy weather, it is necessary to provide windshield wiping systems whose overall wiper blade length is more than 600 mm, particularly up to 1,300 mm.

Special problems occur when the above-mentioned windshields are spheroidally curved and as the result of the high traveling speed in the operation. Thus, high traveling speeds require a particularly low air resistance. On the other hand, the arms of the wiper blade system must not lift off the windshield during the travel and must be securely held, particular in the parking position. In addition, the cost for the solution should be as low as possible.

It is an object of the invention to provide a wiping arrangement, particularly for rail vehicles in the high-speed operation, which solves the above-mentioned problems.

In particular, a system for wiping windshields is to be provided such that a large viewing area is obtained also under unfavorable weather conditions and a good wiping result is achieved even in the case of very curved, for example, spheroidally curved, windshields.

Furthermore, favorable aerodynamic conditions are to be obtained.

According to the invention, these objects are to be achieved in that the individual wiper arms of the wiping arrangement are constructed such that, in least in one position, preferably the inoperative or parking position, they are, in a substantial area of their longitudinal dimension, parallel to one another in a plane essentially perpendicular to the windshield plane. The angle of the plane with respect to the windshield surface is between 75 and 90. The wiper arms are therefore in the so-called biplane arrangement.

When in use, each of the individual wiper arms of the wiping arrangement, driven, for example, by an electric motor, carries out a rotating movement about a pivot assigned to the respective arm. The blade carrier holder or the blade carrier holding device also has two suspension points, one respectively for each arm, at which this arm is mounted, for example, by means of a bolt. As the result of the rotating movement of the wiper arms, the blade carrier holder and therefore the wiper blades also carry out corresponding movements.

It is therefore possible to clear a large viewing surface under poor weather conditions.

In order to obtain good results also in the case of spheroidally curved windshields, at least two wiper blades are arranged in parallel to and offset from each other on the blade carrier holder. In a further development, these may also be suspended in an oscillating manner on the blade carrier holding device. Furthermore, such an arrangement advantageously permits different radii of curvature for the individual blades, for example, of 2,000 mm and 3,000 mm. As the result of the use of wiper blades with different radii of curvature, a particularly good adaptation of the wiping arrangement to the curvature of the windshield can be achieved. The oscillating suspension also permits the wiping of very small radii of curvature of, for example, 2,000 mm, which has not been possible by the wiping arrangements known from the state of the art.

In order to obtain a smooth wiper blade movement in the case of different degrees of wetting on the windshield, a further development of the invention includes guiding devices for the individual wiper blades in the wiping arrangement.

In a further development of the invention, the individual wiper arms have an elliptical or curved profile. This can further reduce the air resistance of the arrangement.

For wiping a viewing area which is as large as possible and for ensuring a wiping of the lower field of viewing area without a collision of the windshield wiper ends with the windshield frame, the spacing of the linking points of the individual wiper arms on the blade carrier holding device is larger than the spacing of the pivots of the windshield wiper arms at the end on the other side of the wiper blades.

In order to permit a high stiffness of the wiper arms in the case of small profile crosssections, in an embodiment of the invention, the wiper arms are made of a fiber composite, preferably of carbon fibers. By using materials of this type, a low height of the wiper arms can be achieved so that the wiper arm height is still within the aerodynamic boundary layer and the air resistance can therefore be minimized.

Other objects, advantages and novel features of the present invention will become apparent from the following detailed description of the invention when considered in conjunction with the accompanying drawings.

BRIEF DESCRIPTION OF THE DRAWINGS

FIG. 1a is a lateral view of the wiping arrangement according to the invention with a parallel wiper arm;

FIG. 1b is a top view of a wiping arrangement with a parallel wiper arm according to FIG. 1a;

DETAILED DESCRIPTION OF THE PREFERRED EMBODIMENTS

Figure 2A:
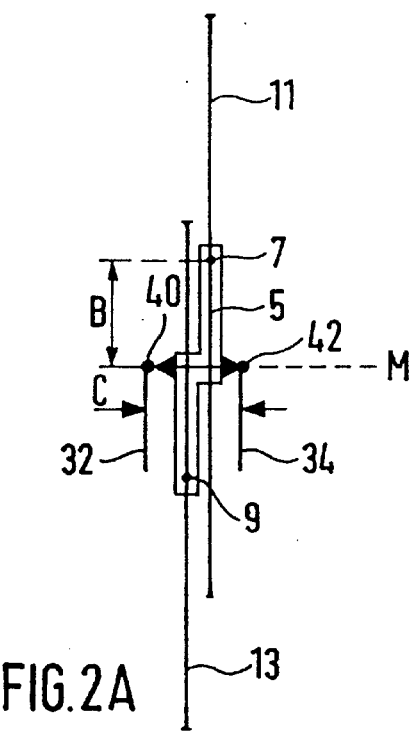
FIG. 2a is a schematic view of the blade carrier with the wiper blades.

FIG. 1a illustrates the wiping arrangement 1 according to the invention with the wiper arm system 3. The blade carrier holding device 5 is rotatably fastened or suspended on the wiper arm system 3. The wiper blades 11, 13, which are arranged offset and parallel to one another, are suspended at points 7 and 9 on the blade carrier holding device 5. The blades 11, 13 oscillate with respect to the blade carrier holding device 5. The stable suspension of the wiper blades 11, 13 along the whole wiper blade length is ensured by a suspension device 15, 17, known from the state of the art. The further development of the suspension device 15, 17 defines the radius of curvature of the wiper blade 11, 13. In order to obtain a particularly good conformity to the windshield in the case of spheroidally curved windshields, the wiper blade rubbers or material 44 are multiply hinged to the blade carrier. In order to ensure a wiper blade movement on the windshield which is as smooth as possible while the degrees of wetting differ, a guiding device 19, 21 is assigned to each of the wiper blades 11, 13. According to the invention, the wiper arm system 3 is constructed as a parallel wiper arm system comprising two individual wiper arms which are illustrated and described in detail in FIG. 2b.

FIG. 1b shows horizontal projection or top view of the blade carriers. The wiper arm system according to the invention includes a first wiper arm 32 and a second wiper arm 34. The first wiper arm 32 is moved about a first pivot 36, which is shown in FIG. 2b and not in FIG. 1b, for example, by a motor. The second wiper arm 34 is moved about a second pivot 38, which is shown in FIG. 2b and not in FIG. 1b. The first wiper arm 32 is rotatably held at point 40 on the blade carrier holding device 5 and the second wiper arm 34 is held at point 42 on the blade carrier holding device 5. In the illustrated position, the two wiper arms 32, 34 are situated in parallel and above one another according to the invention at least in the outlined section A.

The top view according to FIG. 1b clearly shows the arrangement according to the invention of the wiper blades 11, 13 fastened on the first suspension device 15 and on the second suspension device 17, not shown in this view. The wiper blades 11, 13 are arranged offset and at a distance from one another and result in a total wiper length which, in the preferred embodiments, amounts to more than 600 mm but does not exceed 2,000 mm.

Figure 2B:
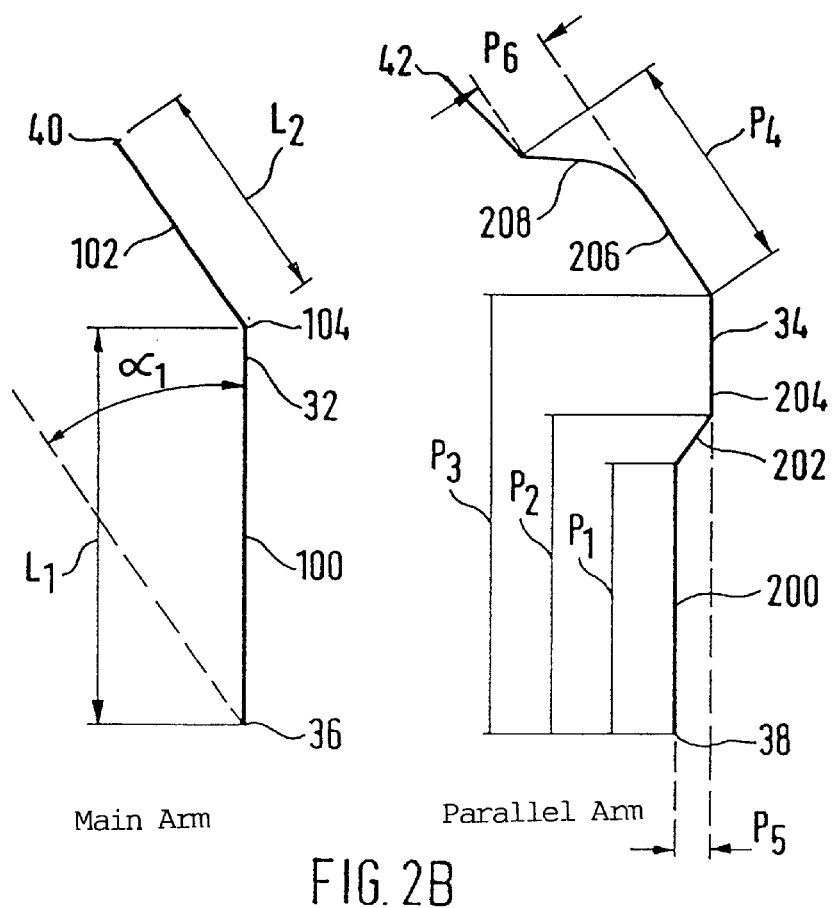
FIG. 2b is a schematic view of the main arm and the parallel wiper arm of a first embodiment of the parallel wiper arm system.

In another schematic representation, FIG. 2a shows the blade carrier holder 5 with the wiper blades 11, 13 which are held at the suspension points 7, 9 by means of suspension devices which are not shown in this drawing.

A bolt 43 (FIG. 2c) connects the two fastening points 40, 42 which are axially spaced from one another. The blade carrier holder 5 is swivellably disposed on the bolt 43 so that the wiper blades will be in an optimally close contact with the windshield.

An embodiment of the further development of the two wiper arms 32, 34 is illustrated in FIG. 2b.

The first wiper arm 32 is also called a main arm and comprises two sections 100, 102. The first section 100 extends from the pivot 36, in which the wiper arm is driven, to a point 104. The first section is adjoined in point 104 at an angle γ 1 by a second section 102, which ends in the suspension point 40 of the blade carrier holding device 5. In the illustrated embodiment, the angle from the first section 100 to the second section 102 amounts to 35.7°.

In the present embodiment, the length L1 of the first section 100 is 510 mm and the length L2 of the second section is 297 mm.

FIG. 2b illustrates, in addition to the main arm, also the second individual arm of the parallel wiper arm system, the so-called parallel arm. In the illustrated embodiment, the parallel arm comprises a total of five sections, specifically a first section 200, a second section 202, a third section 204, a fourth section 206, and a fifth section 208.

The set-back section 202, which is characteristic of the parallel arm, provides that the sections 204 and 206 come to be situated directly above the sections 100 and 102 of the main arm in the arrangement according to the invention at least in one position, such as the parking position even if each arm has its own center of rotation or pivot. Also, the requirement that the two individual wipers be parallel to one another in their predominant range in their longitudinal dimension is implemented in this embodiment by the main arm and the parallel arm.

In the illustrated embodiment, the pivot 38 of the parallel arm is arranged at the lower end of the first section 200, and the fastening point 42 is arranged at the blade carrier holder at the fifth section 208.

In the illustrated embodiment, the dimensions advantageously have the following values:

P1: 349 mm
P2: 407 mm
P3: 564 mm
P4: 297 mm

The set-back from the first to the third section P5 amounts to 45 mm and the spacing P6 is 110 mm, which corresponds to the spacing of the suspension points at the blade carrier holder 5.

Figure 2C:
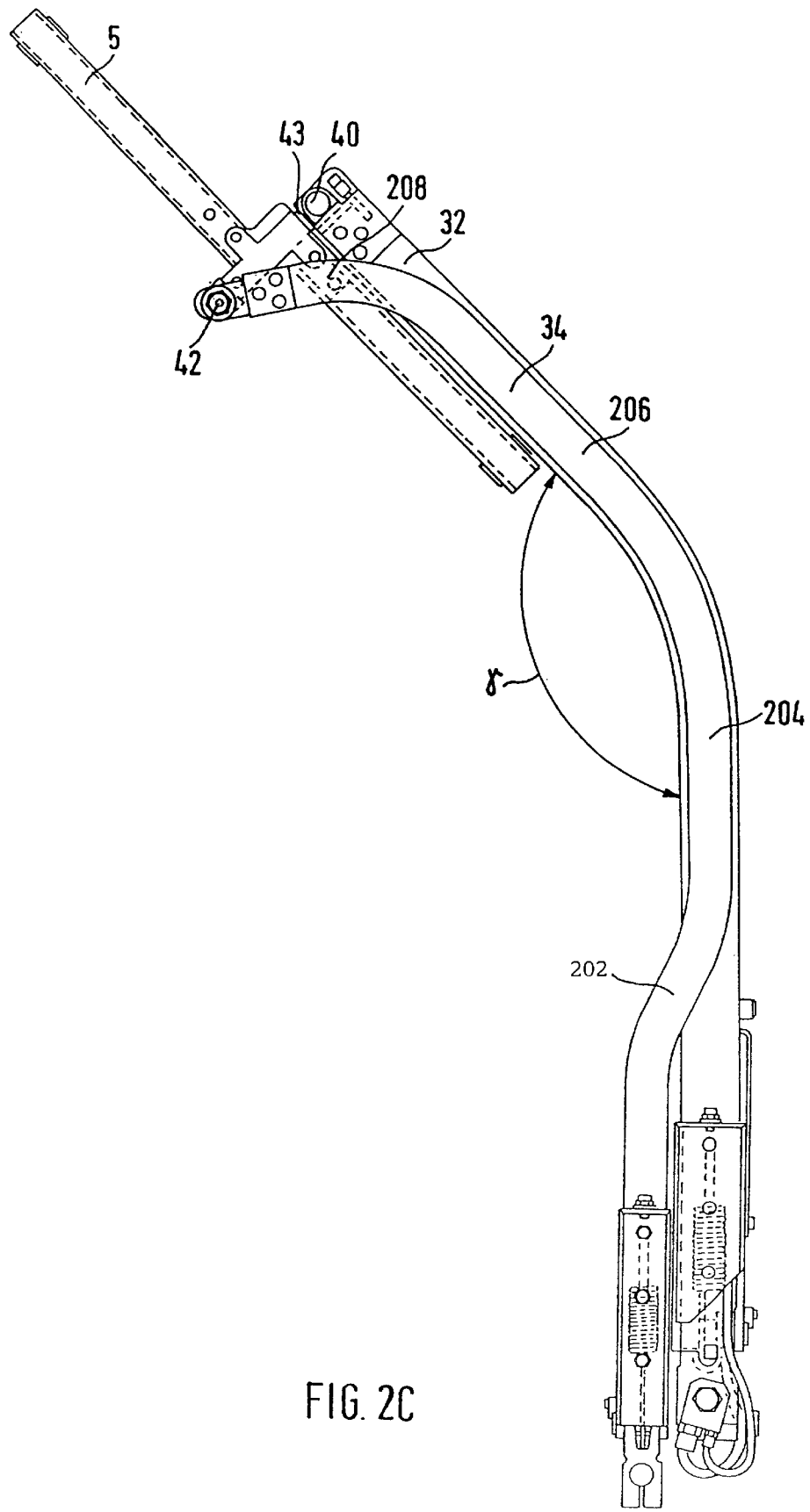
FIG. 2c is a view of the second embodiment of a parallel wiper arm system with a bent parallel arm.

As another variant of the invention, FIG. 2c shows a parallel wiper arm in a bent construction. Components which are identical to those of the above-described embodiments have the same reference numbers.

The bent transition in section 202 as well as in the area of sections 204 and 206 to section 208 of the parallel arm is clearly illustrated.

In the illustrated embodiment, the angle γ between section 204 and 206 of the parallel wiper arm amounts to 140°.

Figure 3:
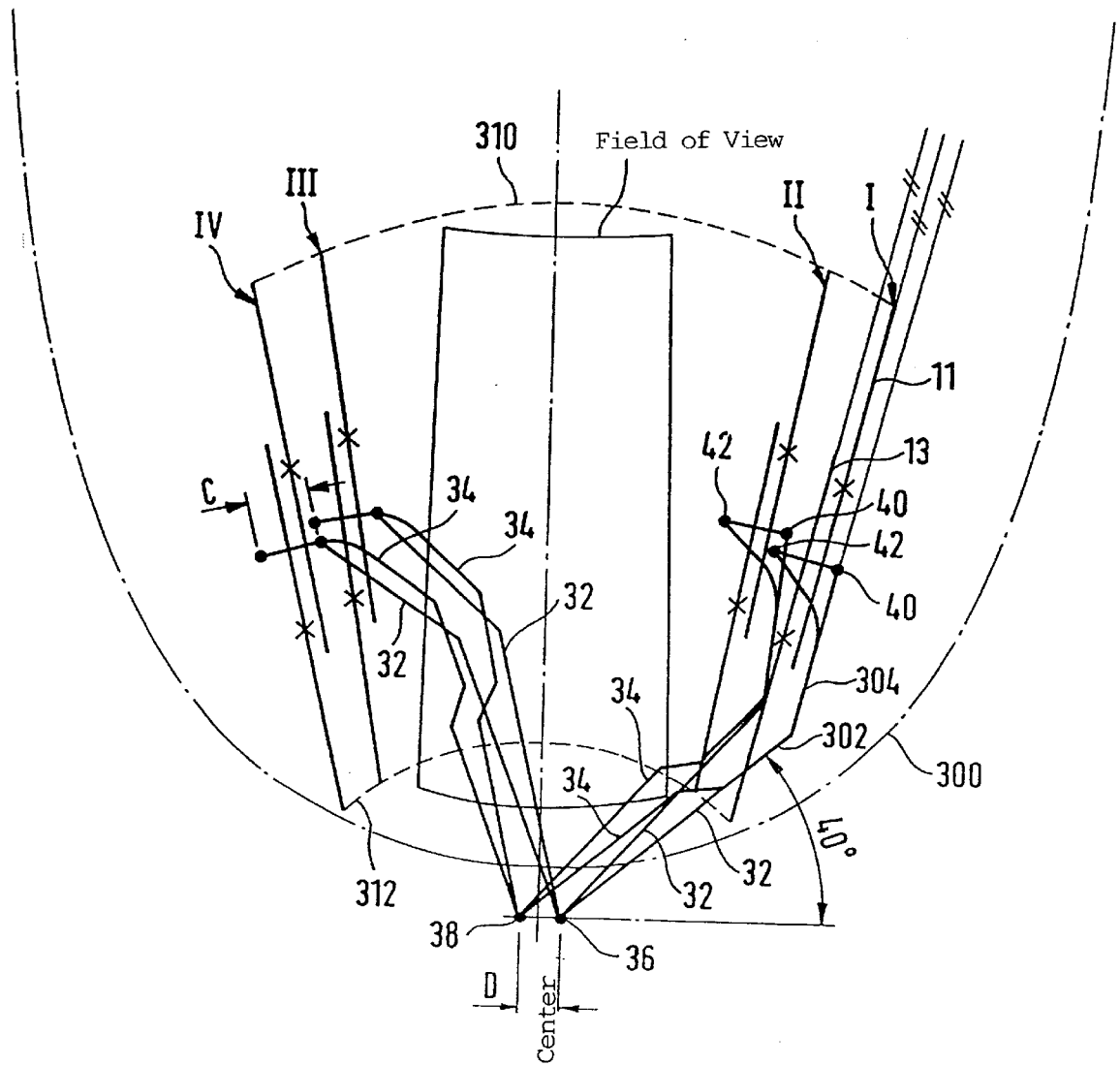
FIG. 3 is a view of the arrangement and of the wiping field of the wiping arrangement according to the invention.

FIG. 3 illustrates the arrangement of the wiper system according to the invention comprising two individual wiper arms according to the embodiment illustrated in FIG. 2b shown in various operating positions. Below the spheroidal windshield 300, the two pivots 36, 38, about which the individual wiper arms are moved and are situated. The main arm 22 is swivelled about the pivot 36. In the inoperative position, the main arm 32 has an angle of 40° with respect to the normal line. The parallel arm 34 carries out a rotating movement about the pivot 38.

The main arm 32 is fastened at point 40 on the blade carrier holder 5 which is not shown in detail in the present drawing, and the parallel arm 34 is fastened at fastening point 42. The two wiper blades 11, 13 are also shown.

FIG. 3 shows a total of four operating positions of the wiper arrangement according to the invention.

Position I: Parking position of the wiper arrangement according to the invention which permits, for example, a driving through drive-through washing installations. As clearly demonstrated, in this position, the two individual wiper arms 32, 34 are situated in parallel to one another on a significant longitudinal section, specifically in the outlined sections 302, 304.

In position II, it is clearly demonstrated that the two wiper arms 32, 34 open at least in the area 302.

This is intensified in position III and particularly in position IV. The reversal point of the wiping arrangement according to the invention is reached in position IV.

FIG. 3 also clearly shows that the spacing D of the pivots 36, 38 is smaller than the spacing C of the two guiding points 40, 42 of the wiper arm on the blade carrier holder. By means of such an adaptation, it is achieved that, as the result of a rotating movement of the two wiper arms, the wiper blades carry out not only a rotating movement but also a swivelling movement. This prevents the collisions between the windshield wiper ends and the windshield wiper edge in the lower part of the viewing area. Also, a considerably larger viewing area is wiped than in the case of a pure rotating movement.

The two wiper arms may preferably be made of a fiber composite, particularly of a carbon fiber composite, so that a very high stiffness can be achieved while the profile cross-sections are small. This results in a low height of the wiper arm, so that the wiper arm height is still within the aerodynamic boundary layer and the air resistance can thereby be minimized.

By means of the present invention, a wiper arrangement is therefore provided for the first time which can wipe very large areas of a windshield surface, excellent results also being achieved for spheroidally shaped windshields, particularly in the case of high-speed rail vehicles, and a sufficient press-on force also existing at high speeds over the whole wiping area.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A system for wiping windshields, comprising:
   a main wiper arm pivotally connectable adjacent its first end to a main shaft;
   a parallel wiper arm pivotally connectable adjacent its first end to a pivot point;
   a blade carrier connected to the main wiper arm and the parallel wiper arm at respective spaced-apart linking points;
   at least two spaced-apart wiper blades carried by the blade carrier substantially perpendicular to an axis extending through the linking points;
   wherein, when the main wiper arm and the parallel wiper arm are in a first position, the arms are parallel to one another and a substantial portion of each lies in a common plane essentially perpendicular the windshield;
   wherein each wiper blade is connected to the blade carrier at a connecting point, said connecting points being distal and on opposite sides of the blade carrier-wiper arm connection and each wiper blade being guided by a guide member proximate the blade carrier-wiper arm connection.

2. A system according to claim 1, wherein the blades are arranged on the blade carrier, essentially offset and parallel to one another.

3. A system according to claim 2, the total wiper blade length of the two wiper blades is larger than 600 mm.

4. A system according to claim 2, wherein the individual wiper blades are suspended on the blade carrier in an oscillating manner.

5. A system according to claim 2, wherein each blade has a first end distal the blade carrier and a second end proximate the blade carrier, and wherein the second ends of each of the blades only overlap one another with respect to lines transverse to the blades in an area that lies substantially between the connecting points that connect each blade to the blade carrier, that are farther distant from the swivellable connection.

6. A system according to claim 1, wherein the wiper arms each have a curved profile.

7. A system according to claim 1, wherein the blade carrier is swivellably connected with the windshield wiper arms.

8. A system according to claim 7, including rotatable bolts swivellably connecting the blade carrier to the wiper arms.

9. A system according to claim 1, wherein the linking points are more set apart than the pivots of the wiper arms.

10. A system according to claim 1, wherein the wiper arms comprise a fiber composite.

11. A system according to claim 10, wherein the fiber composite includes carbon fibers.

12. A system according to claim 11, wherein the first position is a park position.

13. A system according to claim 1, wherein:
   the main wiper arm includes first and second sections disposed at an angle with respect to each other along a longitudinal axis of the main wiper arm; and
   the parallel wiper arm includes a first and second section disposed at an angle with respect to each other along a longitudinal axis of the parallel wiper arm.

14. A system according to claim 13, wherein:
   the main shaft engages the main wiper arm at a point on the first section; and, the main wiper arm is attached to the blade carrier at the second section; and
   the parallel wiper arm includes a third section connected to and offset from the first section and a fourth section extending transverse to the second section, the parallel arm engages the pivot point on the third section and is attached to the blade carrier at the fourth section.

15. A system according to claim 14 wherein the pivot point is offset from the main shaft and the linking points are offset.

16. A system according to claim 1, wherein the wiper arms each have an elliptical profile.

17. A system according to claim 1, wherein the main wiper arm is on top of the parallel wiper arm when in the first position.

18. A system according to claim 1, wherein the blade carrier is swivellably disposed on a bolt which connects the two linking points.

19. A system according to claim 1, wherein the blade carrier has two parallel extensions, fixed with respect to one another, that hold the wiper blades and the extensions overlap each over substantially in the area of the blade carrier-wiper arm connection.

20. In a vehicle having a spheroid curved windshield and a windshield wiping system, the system comprising:
   a main wiper arm pivotally coupled adjacent its first end to a main shaft;
   a parallel wiper arm pivotally connected adjacent its first end to a pivot point;
   a blade carrier swivellably connected to the main wiper arm and the parallel wiper arm at respective spaced-apart linking points;
   at least two wiper blades carried by the blade carrier substantially perpendicular to an axis extending through the linking points;
   wherein, when the main wiper arm and the parallel wiper arm are in a first position, the arms are parallel to one another and lie in a plane essentially perpendicular the windshield;
   wherein the blade carrier has two parallel extensions, fixed with respect to one another, that hold the wiper blades and those extensions overlap each other substantially in the area of the swivellable connection.

21. A system according to claim 20, wherein each wiper blade is connected to the blade carrier at a connecting point, said connecting points being distal and on opposite sides of the swivellable connection and each wiper blade being guided by a guide member proximate the swivellable connection.

* * * * *